United States Patent [19]
Sundquist

[11] Patent Number: 5,755,843
[45] Date of Patent: May 26, 1998

[54] AIR FILTER WITH REUSABLE GABLE PLATE

[75] Inventor: Tommy Sundquist, Lindome, Sweden

[73] Assignee: AB Volvo, Sweden

[21] Appl. No.: 737,013

[22] PCT Filed: May 9, 1995

[86] PCT No.: PCT/SE95/00506
§ 371 Date: Oct. 30, 1996
§ 102(e) Date: Oct. 30, 1996

[87] PCT Pub. No.: WO95/30829
PCT Pub. Date: Nov. 16, 1995

[30] Foreign Application Priority Data

May 10, 1994 [SE] Sweden ................................ 9401617

[51] Int. Cl.⁶ .................................................. B01D 46/24
[52] U.S. Cl. .................. 55/385.3; 55/498; 55/502; 123/198 E
[58] Field of Search .................... 95/273; 55/385.3, 55/502, 498, 503, 504, 507; 123/198 E

[56] References Cited

U.S. PATENT DOCUMENTS

| | | | |
|---|---|---|---|
| 2,822,059 | 2/1958 | Lunn et al. | 55/504 |
| 2,887,177 | 5/1959 | Mund et al. | 55/502 |
| 3,423,909 | 1/1969 | Bennett et al. | 55/502 |
| 3,616,618 | 11/1971 | Groholz et al. | 55/502 |
| 3,672,130 | 6/1972 | Sullivan et al. | 55/498 |
| 4,020,783 | 5/1977 | Anderson et al. | 55/502 |
| 4,135,899 | 1/1979 | Gauer | 55/502 |
| 4,261,710 | 4/1981 | Sullivan | 55/502 |
| 4,278,455 | 7/1981 | Nardi | 55/502 |
| 4,482,368 | 11/1984 | Roberts | 55/502 |
| 4,950,317 | 8/1990 | Sottermans | 55/498 |
| 5,071,456 | 12/1991 | Binder et al. | 55/502 |
| 5,120,337 | 6/1992 | Benzler et al. | 55/498 |
| 5,171,342 | 12/1992 | Trefz | 55/498 |
| 5,547,480 | 8/1996 | Coulonvoux | 55/498 |

FOREIGN PATENT DOCUMENTS

| | | |
|---|---|---|
| 0 059 562 | 9/1982 | European Pat. Off. . |
| 1299720 A | 6/1962 | France . |
| 40 24 898 A1 | 2/1992 | Germany . |
| 201 270 | 1/1966 | Sweden . |
| WO 91/00423 | 1/1991 | WIPO . |

*Primary Examiner*—Duane S. Smith
*Attorney, Agent, or Firm*—Lerner, David, Littenberg, Krumholz & Mentlik

[57] ABSTRACT

An air filter for use in combustion engines, having a reusable gable plate. The air filter includes a cylindrical housing having an inlet opening, an outlet opening and a filter element for radial air percolation and axial flow of filtered air. The filter element includes thin plates at its ends. One of the plates is extended into a flange. A seal is arranged around the flange. The flange and seal are clamped to the outer side of one gable of the housing by a cover used for attaching the filter element.

3 Claims, 3 Drawing Sheets

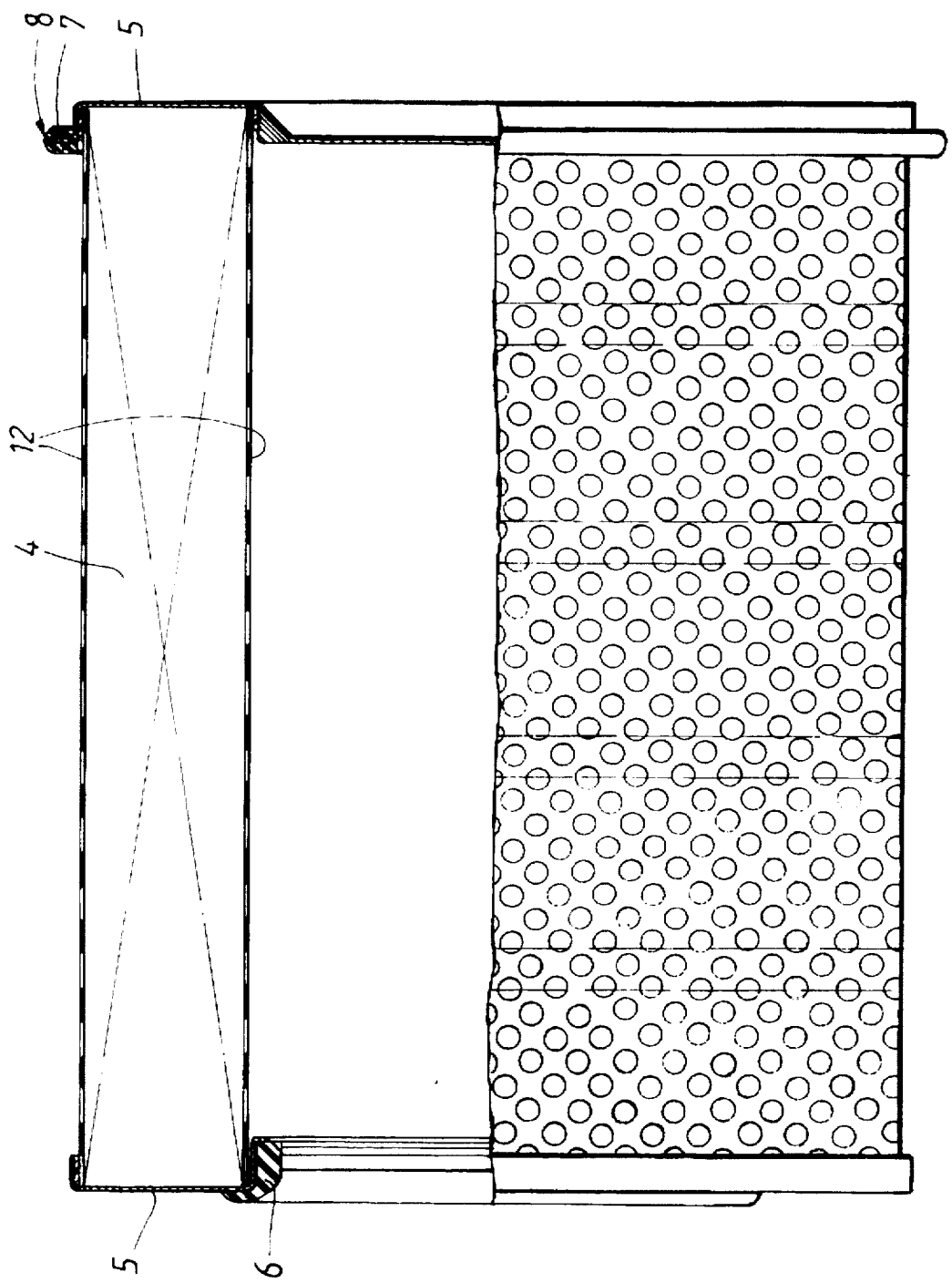

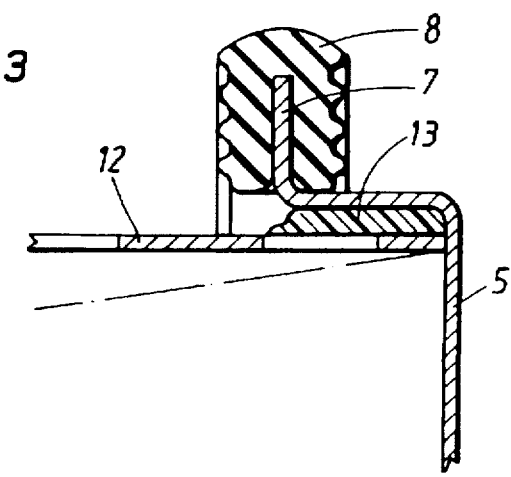
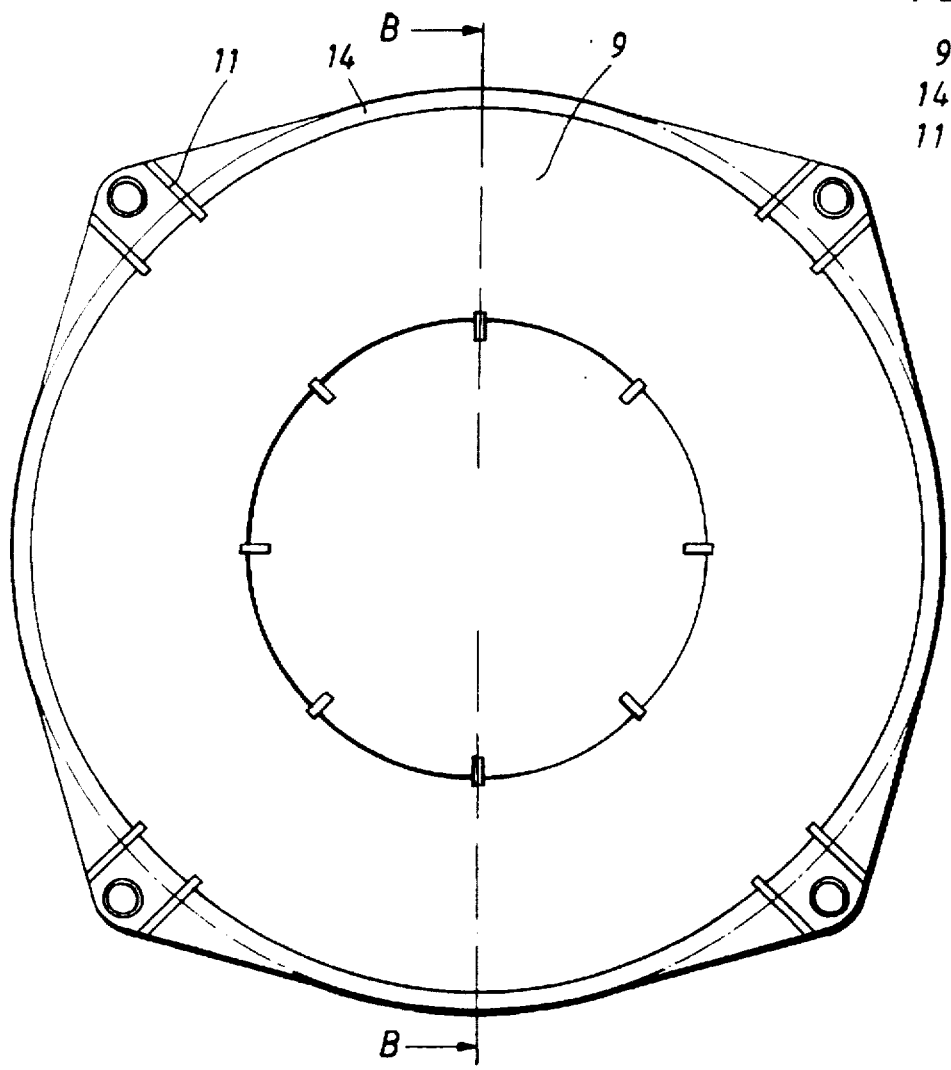
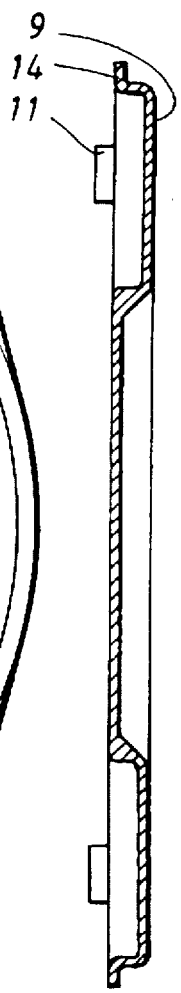

AIR FILTER WITH REUSABLE GABLE PLATE

TECHNICAL FIELD

The present invention relates to an air filter especially one which is used for intake air in combustion engines and the like, and relates especially to air filters for engines in lorries.

BACKGROUND OF THE INVENTION

It is an important requirement for problem-free and long lasting operation of combustion engines that the air which is sucked in for combustion is filtrated and is, as far as possible, free from solid particles. Ever since combustion engines were first used, air filters have been used and a very great number of different constructions of intake filters have therefore been developed and become commonly recognized.

In a usual type of filter for combustion engines in vehicles, a cylinder-shaped filter is used which consists of folded paper where the air is sucked radially in through the folded paper forming a thick cylinder wall and where the cleaned air is sucked out from the filter axially through a central opening in the gable of the filter. The filters are often flat-shaped, i.e. the diameter is much larger than the axial length of the filter, but even the reversed shape may occur and this type is especially used for filtering air in lorry engines.

The paper filter is usually located in a housing or casing and it must therefore be sealed in a suitable way to the housing so that the air is forced to pass through the filter and no leakage of air streams passing outside the filter occurs. These radial filters are therefore sealed at the gable ends and these gables are in turn sealed against the surrounding house. The gable ends are therefore often provided with a steel plate or the like so that no air can penetrate in via the gables outside the filter. Examples of such filters are described in U.S. Pat. No. 5 071 456, W 91/00423 and the Swedish patent 201 270.

The known air filters above work reasonably well, and they clean the air to a desired extent without great problem. After some time of use they must however be exchanged since particles from the unclear air are caught in the filter and this will slowly be clogged. The filter must therefore be exchanged and it cannot be reused. Thus an environmental problem arises. The filter itself, which consists of paper, does not create such a problem but one of the gable plates, which is air tight and attached to the filter arid which usually supports the filter, is thick and must also be discarded as it is united with the filter. This gable plate usually consists of steel and it is often coated with zinc and varnished. It has therefore long been a desire, especially from an environmental point of view, to create a filter in which this plate does not have to be discarded every time a filter is changed and instead construct a filter without is substantial end plate which is undetachably united with the filter part.

SUMMARY OF THE INVENTION

According to the present invention an air filter has therefore been created especially for intake air in combustion engines etc, comprising a cylinder shaped housing having inlet openings for air in the envelope surface and an outlet opening for filtered air in one of the gable surfaces and, arranged in the housing a cylinder-shaped filter element having thick walls for radial air percolation inwardly and axial out flow (of filtered air) centrally through one of the gables, which filter element is provided with plates at the gable ends and via these plates is sealed to the housing which is characterized in that the plate at that gable end which is not provided with the outlet for filtered air extends radially beyond the thick filter wall and is provided at its circumferential portion with sealing material for sealing against the gable of the housing on the outer side by changing a cover against the gable which cover is screwed against the gable at the circumferential regions of the gable and the cover.

The air filter according to the invention is also characterized in that the seal consists of a ring having a U-shaped cross section which is drawn over the edge of the plate.

The seal according to the invention consists suitably of rubber or polyurethane.

According to the invention, it is suitable that the periphery of the seal extends substantially flush with the periphery of the cover and that the attachment lugs of the cover are provided with spacer shoulders corresponding approximately to the thickness of the plate with compressed seal.

BRIEF DESCRIPTION OF THE DRAWINGS

The invention will be described in the following in greater detail with reference to the attached drawings where FIG. 2 shows the filter element according to the present invention also partly in section, FIG. 3 shows an enlargement of the seal according to the invention, FIG. 4 shows the end cover seen from the front side, and end cover in cross section.

DETAILED DESCRIPTION OF PREFERRED EMBODIMENTS

Figure 1:
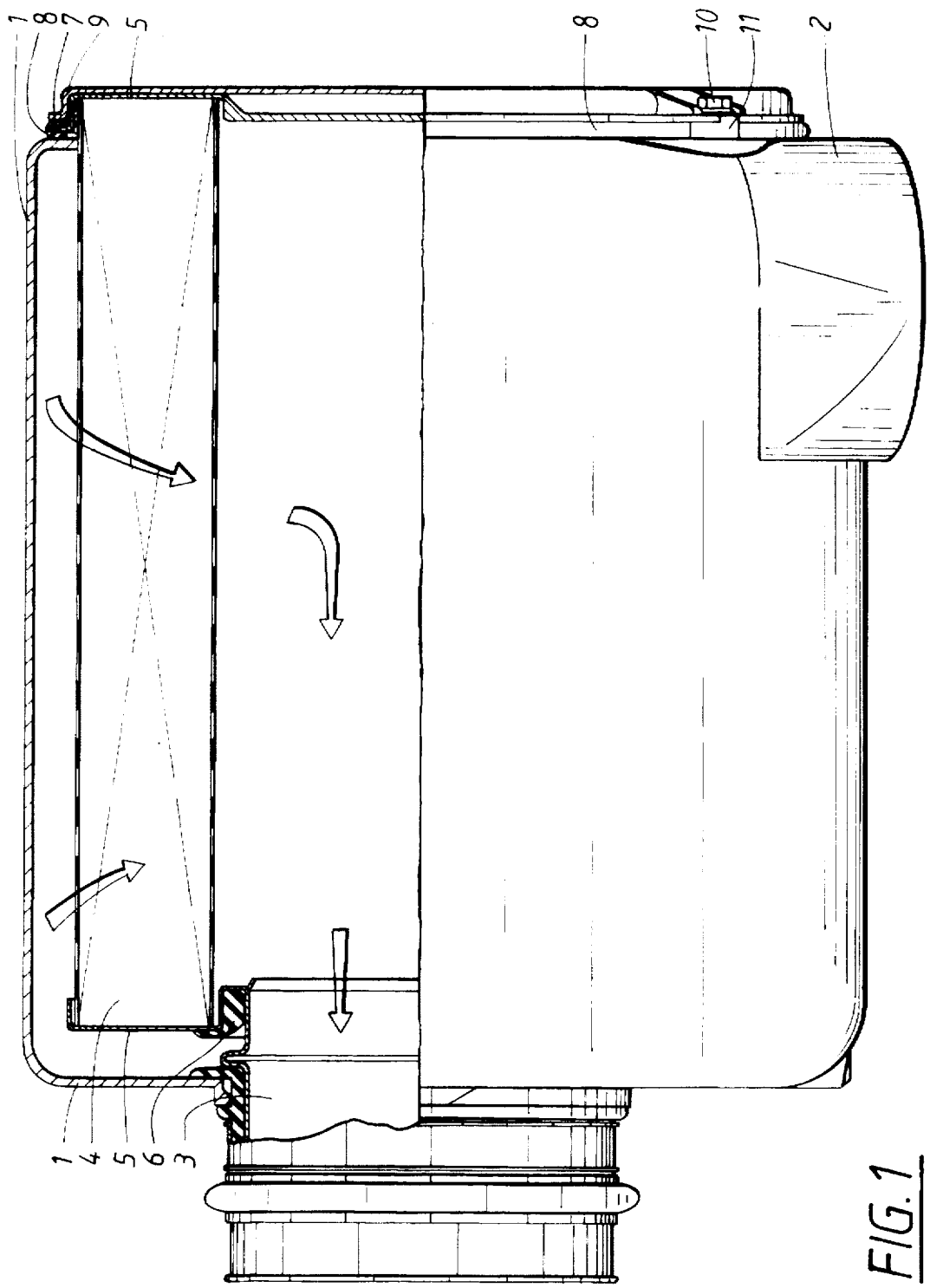
FIG. 1 shows an air filter according to the present invention partly in section.

FIG. 1 shows the filter having an outer housing 1. The housing is cylinder-shaped and has end gables. The housing 1 is provided on the envelope surface with an inlet opening 2 for air and, at one gable end 3, with an outlet opening for cleaned and filtered air. The outlet opening 3 consists of a pipe section of known kind. A filter element 4 is arranged within the housing 1. The filter element is also cylinder shaped and has a thick wall consisting of folded paper in a known way. The filter element 4 is provided with thin plates 5 at both gable ends. The end of the filter element 4 which is shown to the left in the drawing is sealed in a known way against the pipe section of the outlet opening 3 and thus also against the housing 1 by means of a seal 6 which is known per se.

At the other end, namely to the right in FIG. 1 the plate 5 which is attached to the end of the filter element 4 and which is thin, is extended to a flange 7. The flange 7 is provided with a ring seal 8 having a U-shaped cross section. This ring B has been drawn over the flange 7, the ring 8 can also, if desired, consist of two ring shaped discs on either side of the flange 7. The ring seal 8 and the flange 7 are pressed against the gable of the housing 1 by means of a flange on a cover 9. This cover 9 is suitably screwed to the housing 7 by four screws 10. These screws 10 penetrate projecting lugs equally spaced from each other on the circumference of the cover. So that the seal 8 can be visible, these lugs are provided with a distance shoulder 11 which will thus abut against the gable wall on the housing 1. These distance shoulders 11 suitably have a dimension which corresponds to the thickness of the flange 7 and the seal 8 in a compressed state.

The cover 9 consists suitably of steel or a stiff plastic material and it can be reused when an exchange of the filter element 4 is carried out. The only components to be discarded or burned together with the filter element 4 are the thin end plates 5 and the seals 6 and 8.

FIG. 2 shows a filter element according to the invention partly in section. The paper filter in the thick cylindric wall has merely been denoted with a symbol since this filter is known earlier. Around the filter part are cylindric perforated plates which allow air percolation. These plates 12 are sealed to the end plates 5 so that the air is forced through the perforated plates 12. The seal 6 is glued to the end plate 5. The end plate 5, at the right in the figure, is, as is visible, extended to a flange 7 which is provided with the seal 8 according to the invention.

FIG. 3 shows an enlargement of the flange 7 with the seal 8 mounted thereon. This seal, which suitably consists of rubber or polyurethane, is provided with grooves on the sides. The reason for this is that it shall be easier to compress the seal. When other sealing materials are used, these grooves may sometimes be omitted and they are neither necessary for the materials mentioned. The perforated plate 12 around the paper filter is as shown fastened to the end piece 5 by means of a seal 13.

Finally, FIG. 4 shows the end cover 9 seen from the front and in section. The cover 9 is provided with flanges 14 which are intended to be pressed against the seal 8. The cover is provided with the distance shoulders 11 and is shaped to receive the end of the filter element 4.

By means of the present invention a filter is obtained which especially adapted for lorries and which when it is to be exchanged, results in the least possible waste. The housing and the cover are also robust so that damage the filter does not easily occur and they are simple and cost effective to produce.

The invention is not limited to the embodiment shown but can be varied in different ways within the scope of the claims.

What is claimed is:

1. An air filter for filtering intake air in combustion engines comprising:

a) a cylindrical housing having an envelope surface, a gable having gable surfaces, an inlet opening for air in said envelope surface, an outlet opening for filtered air in one of said gable surfaces;

b) a cylindrical filter element arranged in said housing and having a thick wall, said filter element allowing radial air percolation inwardly and axial outflow of filtered air centrally through said gable, said filter element further comprising plates at the ends of said gable, wherein said filter element is sealed by said plates to said housing and wherein one of said plates, which is adjacent one of said ends opposite said outlet for filtered air, extends radially beyond said thick wall;

c) sealing material provided at said one of said plates circumferential region for sealing against said gable on the outer side of said housing; and d) a cover for clamping against said gable, said cover being screwed against said gable at the circumferential regions of said gable and said cover, wherein the periphery of said sealing material is substantially flush with the periphery of said cover, said cover further comprising spacer shoulders provided for attachment lugs of said cover, said spacer shoulders approximately corresponding to the thickness of said one of said plates and said sealing material when said sealing material is compressed.

2. An air filter as claimed in claim 1, wherein said sealing material comprises a ring having a U-shaped cross section which is drawn over the edge of said plate.

3. An air filter as claimed in claims 1 or 2, wherein said sealing material comprises rubber or polyurethane.

\* \* \* \* \*

UNITED STATES PATENT AND TRADEMARK OFFICE
CERTIFICATE OF CORRECTION

PATENT NO. : 5,755,843
DATED : May 26, 1998
INVENTOR(S) : Sundquist

It is certified that error appears in the above-indentified patent and that said Letters Patent is hereby corrected as shown below:

Column 1, line 49 "arid" should read --and--.

Column 2, lines 32, 33, "and end " should read --and FIG. 5 shows the end--.

Column 4, line 19 "plates" should read --plates'--.

Signed and Sealed this

Twenty-fifth Day of August, 1998

Attest:

BRUCE LEHMAN

Attesting Officer

Commissioner of Patents and Trademarks